(12) United States Patent
Iwakura et al.

(10) Patent No.: US 11,509,003 B2
(45) Date of Patent: Nov. 22, 2022

(54) COOLING STRUCTURE FOR POWER STORAGE STACK AND COOLING SYSTEM FOR POWER STORAGE STACK

(71) Applicant: TOYOTA JIDOSHA KABUSHIKI KAISHA, Toyota (JP)

(72) Inventors: Kengo Iwakura, Toyota (JP); Tsuyoshi Hayashi, Miyoshi (JP); Isao Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 178 days.

(21) Appl. No.: 16/704,012

(22) Filed: Dec. 5, 2019

(65) Prior Publication Data

US 2020/0243923 A1 Jul. 30, 2020

(30) Foreign Application Priority Data

Jan. 25, 2019 (JP) .............................. JP2019-010840
Oct. 25, 2019 (JP) .............................. JP2019-194214

(51) Int. Cl.
*H01M 10/625* (2014.01)
*H01M 10/6566* (2014.01)
*H01M 10/613* (2014.01)
(Continued)

(52) U.S. Cl.
CPC ....... *H01M 10/625* (2015.04); *H01M 10/613* (2015.04); *H01M 10/617* (2015.04);
(Continued)

(58) Field of Classification Search
None
See application file for complete search history.

(56) References Cited

U.S. PATENT DOCUMENTS 7,045,236 B1* 5/2006 Andrew .............. H01M 10/613
429/83
2010/0236854 A1* 9/2010 Nakamura ............ H01M 50/10
180/68.5
(Continued)

FOREIGN PATENT DOCUMENTS

| JP | 2007-172983 A | 7/2007 |
| JP | 2011-76967 A | 4/2011 |
| JP | 2011-96478 A | 5/2011 |
| JP | 2014-135237 A | 7/2014 |

*Primary Examiner* — Ula C Ruddock
*Assistant Examiner* — Mary Grace Byram
(74) *Attorney, Agent, or Firm* — Oliff PLC (57) ABSTRACT

A cooling structure includes a power storage stack including power storage cells, first and second end plates, a refrigerant supply path for supplying refrigerant, and first paths each provided in a clearance between two of the adjacent power storage cells. The first end plate is configured to form a second path communicating with the refrigerant supply path in a clearance between a first end of the power storage stack and the first end plate. The second end plate is configured to form a third path communicating with the refrigerant supply path in a clearance between a second end of the power storage stack and the second end plate. The power storage stack is cooled to have a temperature distribution in which the power storage cells disposed on the second end side have temperatures higher than the temperatures of the power storage cells disposed on the first end side.

3 Claims, 10 Drawing Sheets

(51) Int. Cl.
*H01M 10/6557* (2014.01)
*H01M 50/20* (2021.01)
*H01M 10/6563* (2014.01)
*H01M 10/647* (2014.01)
*H01M 10/637* (2014.01)
*H01M 10/6556* (2014.01)
*H01M 10/617* (2014.01)

(52) U.S. Cl.
CPC ....... *H01M 10/637* (2015.04); *H01M 10/647* (2015.04); *H01M 10/6556* (2015.04); *H01M 10/6557* (2015.04); *H01M 10/6563* (2015.04); *H01M 10/6566* (2015.04); *H01M 50/20* (2021.01); *H01M 2220/20* (2013.01)

(56) References Cited

U.S. PATENT DOCUMENTS

| | | | |
|---|---|---|---|
| 2011/0104547 A1* | 5/2011 | Saito | H01M 10/625 429/120 |
| 2011/0104548 A1* | 5/2011 | Saito | H01M 10/6566 429/120 |
| 2015/0133041 A1* | 5/2015 | Kiya | B60L 50/51 454/69 |
| 2015/0357617 A1* | 12/2015 | Okada | H01M 10/6557 429/120 |
| 2016/0126604 A1* | 5/2016 | Hiroe | H01M 10/6563 429/83 |

* cited by examiner

COOLING STRUCTURE FOR POWER STORAGE STACK AND COOLING SYSTEM FOR POWER STORAGE STACK

This nonprovisional application is based on Japanese Patent Application No. 2019-010840 filed on Jan. 25, 2019 and No. 2019-194214 filed on Oct. 25, 2019, with the Japan Patent Office, the entire contents of which are hereby incorporated by reference.

BACKGROUND

Field

The present disclosure relates to a cooling structure for a power storage stack and a cooling system for a power storage stack.

Description of the Background Art

Electric vehicles and hybrid vehicles are equipped with a battery pack serving as a power storage device for supplying power to a motor. The battery pack includes a battery stack and a housing case housing the battery stack. The battery stack includes cells arranged side by side in a predetermined direction of arrangement and serves as a power storage stack. The battery stack has output characteristics that decrease along with a temperature rise, and accordingly, the battery stack is cooled in the housing case.

Japanese Patent Laying-Open No. 2014-135237 discloses a cooling structure that cools a battery stack. In the cooling structure disclosed in Japanese Patent Laying-Open No. 2014-135237, a refrigerant flow path is provided between adjacent cells to be orthogonal to a refrigerant supply flow path through which refrigerant for cooling the battery stack flows in the direction of arrangement of cells. A first end plate and a second end plate are disposed on the opposite sides of the battery stack in the direction of arrangement, and the first end plate is disposed on the inlet side of the refrigerant supply flow path.

The first end plate includes a main body facing a first end of the power storage stack in the direction of arrangement and a shunt plate extending from the main body in the direction of arrangement, and a connection between the main body and the shunt plate is provided with an opening for taking in the refrigerant. The shunt plate forms a shunt space facing some cells disposed on a first side in the direction of arrangement within the refrigerant supply flow path, and directs the refrigerant taken in through the opening to the shunt space toward the refrigerant flow path formed between these cells. This allows the refrigerant to flow toward the first end of the battery stack toward which the refrigerant flows less easily.

SUMMARY

In the cooling structure for a battery stack disclosed in Japanese Patent Laying-Open No. 2014-135237, however, the main body of the first end plate and the main body of the second end plate are disposed to be in close contact with adjacent cells. Consequently, a refrigerant flow path through which refrigerant flows is not formed between the main body of the first end plate and the cell and between the main body of the second end plate and the cell. The above arrangement cools only one of a pair of lateral portions opposed to each other in the direction of arrangement in the cells located at the opposite ends in the direction of arrangement and cools both of the pair of lateral portions in the other cells. This makes the temperatures of the cells disposed at the opposite ends in the direction of arrangement higher than the temperatures of the other cells. In such a case, the temperature of the battery stack varies, and the power storage stack has higher temperatures on its opposite sides, thus leading to complicated management of the temperature of the battery stack.

The present disclosure has been made in view of the above problem, and has an object to provide a cooling structure for a power storage stack and a cooling system for a power storage stack that enable easy management of the temperature of the power storage stack with reduced variations in the temperature of the power storage stack.

A cooling structure for a power storage stack according to the present disclosure includes a power storage stack, a first end plate and a second end plate, a refrigerant supply path, and a plurality of first paths. The power storage stack includes a plurality of power storage cells arranged in a predetermined direction of arrangement. Each of the first end plate and the second end plate is disposed on a corresponding one of opposite outer sides of the power storage stack in the direction of arrangement. The refrigerant supply path is provided in the direction of arrangement for supplying refrigerant from a first end side toward a second end side of the power storage stack in the direction of arrangement. Each of the plurality of first paths is provided in a clearance between two of the power storage cells adjacent to each other, and the plurality of first paths communicate with the refrigerant supply path. The first end plate is configured to form a second path communicating with the refrigerant supply path in a clearance between a first end of the power storage stack and the first end plate. The second end plate is configured to form a third path communicating with the refrigerant supply path in a clearance between a second end of the power storage stack and the second end plate. The plurality of first paths, the second path, and the third path are configured such that in cooling of the power storage stack by the refrigerant, the power storage stack has a temperature distribution in which the power storage cells disposed on the second end side have temperatures higher than temperatures of the power storage cells disposed on the first end side.

The above configuration forms paths through which refrigerant can flow on opposite sides in the direction of arrangement in each of the plurality of power storage cells arranged side by side in the direction of arrangement. Each of the plurality of power storage cells can thus be cooled from the opposite sides in the direction of arrangement. This can reduce variations in temperature from the first end side to the second end side of the power storage stack in the direction of arrangement.

Further, the plurality of first paths, the second path, and the third path are configured such that in cooling of the power storage stack by refrigerant, the power storage stack has a temperature distribution in which the power storage cells disposed on the second end side of the power storage stack in the direction of arrangement have temperatures higher than the temperatures of the power storage cells disposed on the first end side of the power storage stack in the direction of arrangement. Consequently, the power storage cell arranged at the second end of the power storage stack downstream in a direction of supply of refrigerant has the highest temperature among the power storage cells. Thus, the temperature of the power storage cell disposed at the second end of the power storage stack is managed not to exceed a predetermined reference temperature, so that the temperature of any other power storage cell does not exceed the reference temperature. This leads to easy management of the temperature of the power storage stack.

In the cooling structure for a power storage stack according to the present disclosure, an inlet of the third path may have an area smaller than an area of an inlet of the second path.

With the above configuration, refrigerant less easily flows into the third path located downstream in the direction of supply of refrigerant than into the second path located upstream in the direction of supply of refrigerant.

In the cooling structure for a power storage stack according to the present disclosure, the first end plate may include a first facing wall facing the first end of the power storage stack, and a second facing wall connected to the first facing wall and facing one of the power storage cells which is located at the first end of the power storage stack from a refrigerant supply path side. The second facing wall is preferably provided with an opening for causing a clearance between the first facing wall and the first end of the power storage stack to communicate with the refrigerant supply path. The second end plate may include a third facing wall facing the second end of the power storage stack. The third facing wall may have a first wall, and a second wall connected to the first wall on the refrigerant supply path side and provided to be closer to the second end side of the power storage stack than the first wall is to the second end side of the power storage stack in the direction of arrangement. In this case, a clearance between the first wall and the second end of the power storage stack preferably communicates with the refrigerant supply path through a clearance between the second wall and the second end of the power storage stack. A distance between the second wall and the second end of the power storage stack in the direction of arrangement is preferably smaller than a width of the opening in the direction of arrangement.

Also with the above configuration, the refrigerant less easily flows into the third path through the clearance between the second wall and the second end of the power storage stack than into the second path through the opening. Consequently, the power storage cell disposed at the second end of the power storage stack easily has the highest temperature among the power storage cells, leading to easy temperature management.

The cooling structure for a power storage stack according to the present disclosure may further include a refrigerant duct to be inserted into a first end side of the refrigerant supply path at which the first end plate is located. The first end plate may have a projection projecting opposite to a direction of insertion of the refrigerant duct. In this case, the refrigerant duct preferably has a stopper capable of hitting the projection such that a tip side of the refrigerant duct does not block an inlet of the second path.

The above configuration can prevent the tip side of the refrigerant duct from blocking the inlet of the second path in insertion of the refrigerant duct. This can prevent an increase in the temperature of the power storage cell disposed on the first end side of the power storage stack in the direction of arrangement, thus reducing variations in the temperature of the power storage stack.

A cooling system for a power storage stack according to the present disclosure includes the cooling structure, a refrigerant supply source that supplies the refrigerant to the refrigerant supply path, a controller that controls an operation of the refrigerant supply source, and a thermometer that measures a temperature of one of the power storage cells which is located at the second end of the power storage stack. The controller controls the operation of the refrigerant supply source such that an amount of supply of the refrigerant increases when the temperature measured by the thermometer attains to a predetermined temperature or higher.

The above configuration allows the thermometer to measure the temperature of only the power storage cell which will have the highest temperature, enabling control of cooling of the power storage stack based on the result of measurement by the thermometer with a minimum number of thermometers.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure will now be described in detail with reference to the drawings. In the embodiment below, the same or common parts will be designated by the same reference numerals in the drawings, and the description thereof will not be repeated.

Figure 1:
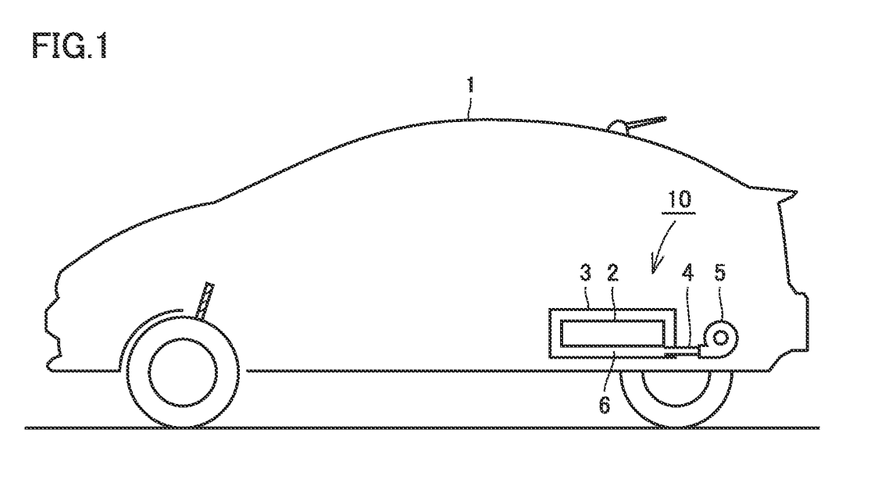
FIG. 1 shows a vehicle equipped with a cooling structure for a power storage stack according to an embodiment.

FIG. 1 is a schematic view of a vehicle equipped with a cooling structure for a power storage stack according to the embodiment. As shown in FIG. 1, a vehicle 1 is equipped with a cooling structure 10 for a power storage stack. Vehicle 1 is a hybrid vehicle capable of traveling on motive power of at least one of a motor and an engine, or an electric-powered vehicle that travels on drive power obtained from electrical energy.

Cooling structure 10 for a power storage stack includes a power storage module 2, a housing case 3, a refrigerant supply path 6, which will be described below, and a refrigerant duct 4. Cooling structure 10 for a power storage stack is a structure for cooling a power storage stack 20, which will be described below, provided in power storage module 2.

Power storage module 2 is housed in housing case 3. Refrigerant supply path 6 that is supplied with refrigerant is formed between power storage module 2 and housing case 3. Refrigerant duct 4 is inserted into a first end side of refrigerant supply path 6. Refrigerant duct 4 is connected to a refrigerant supply source 5, and refrigerant is supplied from refrigerant supply source 5. The refrigerant supplied from refrigerant supply source 5 is supplied to refrigerant supply path 6 through refrigerant duct 4. Refrigerant supply source 5 is, for example, a blower, and in such a case, the refrigerant is cooling air. The refrigerant may be any other refrigerant gas.

The refrigerant supplied to refrigerant supply path 6 cools power storage stack 20 and is then discharged through an exhaust duct (not shown) connected to housing case 3.

Figure 2:
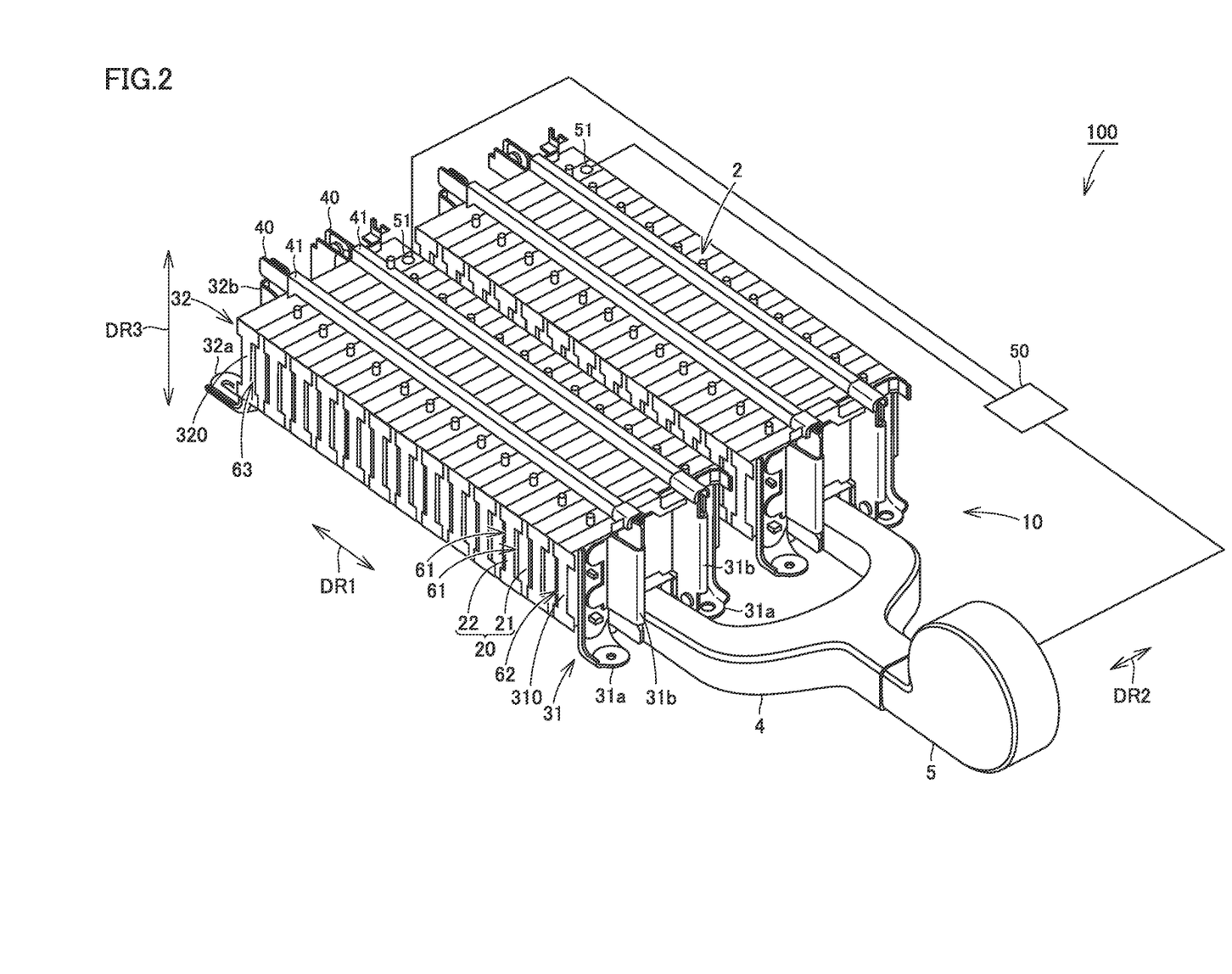
FIG. 2 is a schematic perspective view of a cooling system provided with the cooling structure for a power storage stack according to the embodiment.

FIG. 2 is a schematic perspective view of a cooling system provided with the cooling structure for a power storage stack according to the embodiment. Cooling structure 10 for a power storage stack and cooling system 100 for a power storage stack according to the embodiment will be described in detail with reference to FIG. 2.

As shown in FIG. 2, cooling structure 10 for a power storage stack includes two power storage modules 2. The two power storage modules 2 are disposed side by side in a width direction (direction DR2 in FIG. 2) of power storage stack 20, which will be described below. The number of power storage modules 2 is not limited to two, and three or more power storage modules 2 may be provided.

Power storage module 2 includes power storage stack 20, a first end plate 31, a second end plate 32, and a plurality of restraining members 40. Power storage module 2 is obtained by sandwiching power storage stack 20 between first end plate 31 and second end plate 32 and restraining power storage stack 20 by restraining members 40.

Power storage stack 20 includes a plurality of power storage cells 21 disposed side by side in a predetermined direction of arrangement (direction DR1) and a plurality of spacers 22 disposed side by side in the direction of arrangement. Power storage cells 21 and spacers 22 are disposed alternately side by side.

Power storage cell 21 may be, for example, a cell. The cell is, for example, a secondary cell such as a nickel-hydride cell or a lithium-ion cell. The cell has, for example, a rectangular shape. The secondary cell may include a liquid electrolyte or a solid electrolyte. Note that power storage cell 21 may be a chargeable/dischargeable unit capacitor.

Each of spacers 22 is disposed in a clearance between two adjacent power storage cells 21. Spacer 22 forms a first path 61, which communicates with the refrigerant supply path, in the clearance between two adjacent power storage cells 21.

First path 61 is formed such that refrigerant is introduced from a first side in the height direction (direction DR3) of power storage stack 20 and refrigerant is discharged from opposite lateral sides in the width direction (direction DR2) of power storage stack 20.

First end plate 31 and second end plate 32 are disposed on the opposite outer sides of power storage stack 20 in the direction of arrangement.

First end plate 31 is disposed on the first end side of power storage stack 20 in the direction of arrangement. First end plate 31 is made of, for example, rigid plastic. First end plate 31 may be made of a metal member, for example, aluminum.

First end plate 31 includes a main body 310, a bracket portion 31a, and a fixing portion 31b. Bracket portion 31a and fixing portion 31b are assembled to main body 310. Bracket portion 31a is a member for fixing power storage stack 20 to housing case 3. Fixing portion 31b is a member for fixing restraining members 40.

First end plate 31 is configured to form a second path 62, which communicates with the refrigerant supply path, in the clearance between the first end of the power storage stack and first end plate 31. Second path 62 is formed such that refrigerant is introduced from the first side in the height direction (direction DR3) of power storage stack 20 and refrigerant is discharged from opposite lateral sides in the width direction (direction DR2) of power storage stack 20. An example of the detailed structure of first end plate 31 will be described below with reference to FIGS. 3 to 5.

Second end plate 32 is disposed on a second end side of power storage stack 20 in the direction of arrangement. Second end plate 32 is made of, for example, rigid plastic. Second end plate 32 may be made of a metal member, for example, aluminum.

Second end plate 32 includes a main body 320, which is a third facing wall, a bracket portion 32a, and a fixing portion 32b. Bracket portion 32a and fixing portion 32b are assembled to main body 320. Bracket portion 32a is a member for fixing power storage stack 20 to housing case 3. Fixing portion 32b is a member for fixing restraining members 40.

Second end plate 32 is configured to form a third path 63, which communicates with the refrigerant path, in the clearance between the second end of the power storage stack and second end plate 32. Third path 63 is formed such that refrigerant is introduced from one side in the height direction (direction DR3) of power storage stack 20 and is discharged from opposite lateral sides in the width direction (direction DR2) of power storage stack 20. An example of the detailed structure of second end plate 32 will be described below with reference to FIGS. 6 and 7.

Restraining members 40 couple first end plate 31 and second end plate 32 to each other while being inserted into a plurality of insertion portions 41. Restraining members 40 fix power storage cells 21, spacers 22, first end plate 31, and second end plate 32 under compressive load in the direction of arrangement.

Insertion portions 41 are formed of tubular portions successively provided on top of spacers 22 in the direction of arrangement.

Cooling system 100 includes cooling structure 10 for a power storage stack, refrigerant supply source 5, a controller 50, and a thermometer 51.

Controller 50 controls the operation of refrigerant supply source 5. Thermometer 51 measures the temperature of power storage cell 21 located at the second end of power storage stack 20. The result of measurement (temperature information) by thermometer 51 is input to controller 50. Controller 50 controls the operation of refrigerant supply source 5 based on the result of measurement. Specifically, when the temperature measured by thermometer 51 attains to a predetermined temperature or higher, controller 50 controls the operation of refrigerant supply source 5 such that an amount of supply of refrigerant increases.

When refrigerant supply source 5 is a blower as described above, upon the temperature measured by thermometer 51 attaining to a predetermined temperature or higher, controller 50 increases the rotating speed of the fan.

Figure 3:
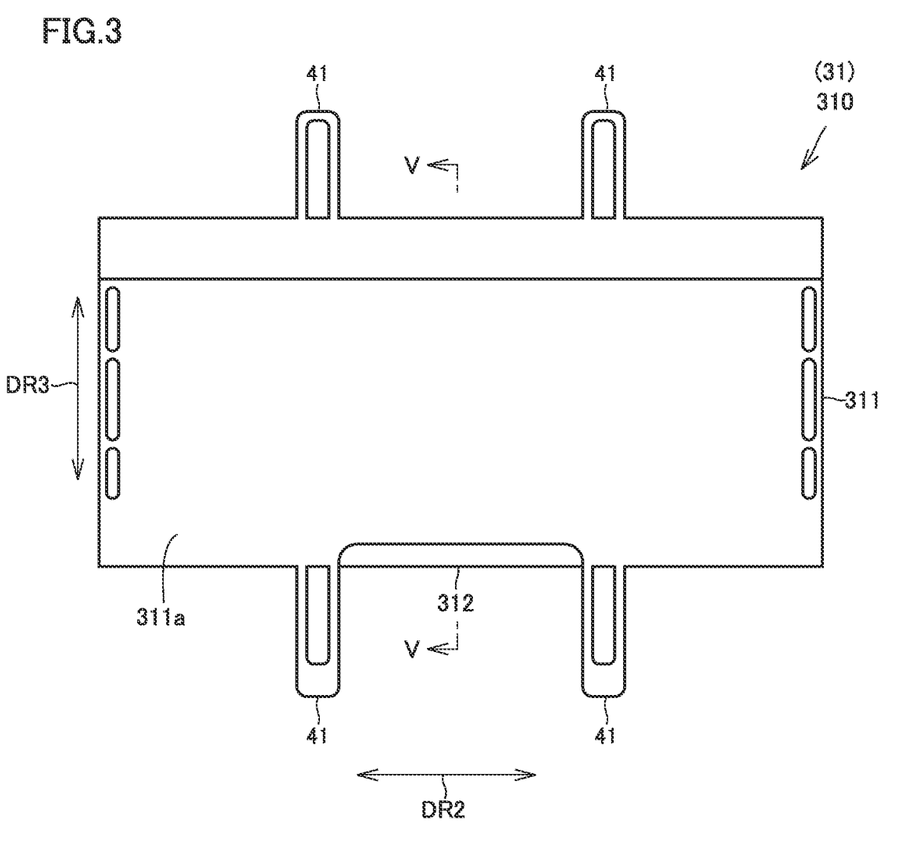
FIG. 3 is a plan view of a main body of a first end plate according to the embodiment, which is viewed from the front side.
Figure 4:
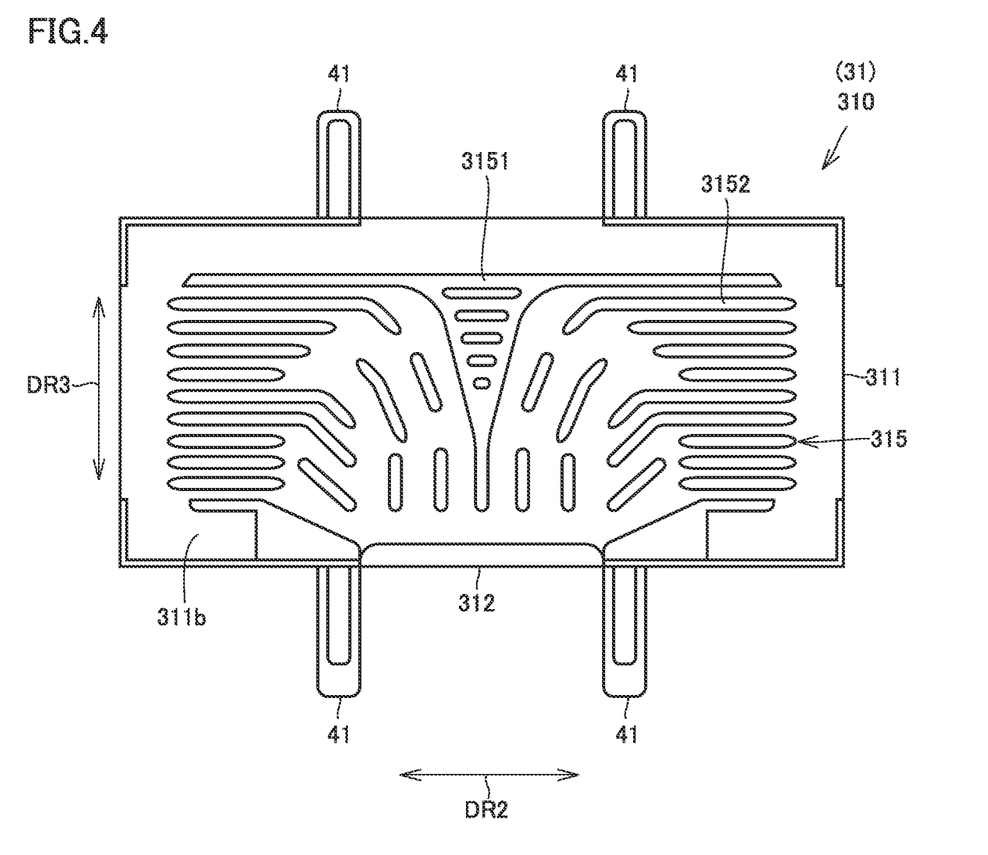
FIG. 4 is a plan view of the main body of the first end plate according to the embodiment, which is viewed from the rear side.
Figure 5:
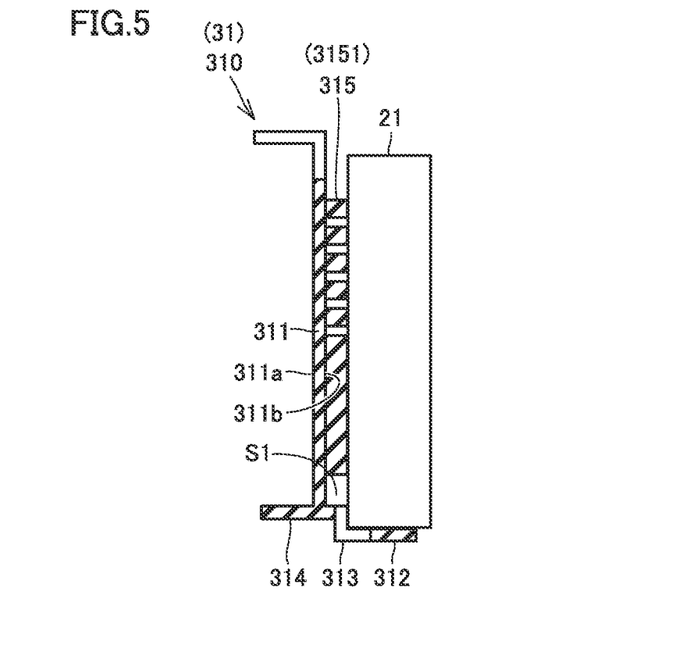
FIG. 5 is a sectional view of the first end plate, which is taken along the line V-V shown in FIG. 3.

FIG. 3 is a plan view of the main body of the first end plate according to the embodiment, which is viewed from the front side. FIG. 4 is a plan view of the main body of the first end plate according to the embodiment, which is viewed from the rear side. FIG. 5 is a sectional view of the first end plate, which is taken along the line V-V shown in FIG. 3. For the sake of convenience, FIG. 5 shows power storage cell 21 located at the first end of power storage stack 20. First end plate 31 will be described with reference to FIGS. 3 to 5.

As shown in FIGS. 3 to 5, first end plate 31 includes a first facing wall 311, a second facing wall 312, and a projection 314.

First facing wall 311 extends parallel to the height direction of power storage stack 20. First facing wall 311 faces the first end of power storage stack 20 in the direction of arrangement. Specifically, first facing wall 311 faces the lateral surface on a first side in the direction of arrangement of power storage cell 21 located at the first end of power storage stack 20. First facing wall 311 is disposed at a distance from the lateral surface on the first side of power storage cell 21.

A front surface 311a side of first facing wall 311 is provided substantially flatly to allow bracket portion 31a and fixing portion 31b to be assembled thereto. A rear surface 311b of first facing wall 311 is provided with a plurality of ribs 315. Ribs 315 are disposed in a clearance S1 between first facing wall 311 and power storage cell 21. Ribs 315 form second path 62 through which refrigerant can flow through clearance S1 between first facing wall 311 and power storage cell 21.

Ribs 315 include a substantially T-shaped rib 3151, which is provided in the central portion of rear surface 311b, and a plurality of ribs 3152, which are discontinuously arranged from the first side in the height direction (direction DR3) of power storage stack 20 toward the second side in the height direction along the line toward the first side or second side in the width direction (direction DR2) of power storage stack 20. This formation of the ribs causes the refrigerant introduced from the first side in the height direction (direction DR3) of power storage stack 20 to be discharged to the opposite sides in the width direction (direction DR2) of power storage stack 20.

First path 61 through which refrigerant flows can be changed appropriately by appropriately changing the shapes of ribs 315. Second path 62 may be formed such that the refrigerant introduced from the first side in the height direction (direction DR3) of power storage stack 20 is discharged to the second side in the height direction (direction DR3) of power storage stack 20.

Second facing wall 312 faces power storage cell 21 located at the first end of power storage stack 20 from the refrigerant supply path 6 (see FIG. 8) side. Second facing wall 312 is connected to first facing wall 311 on the refrigerant supply path 6 side. An opening 313, which serves to cause clearance S1 between first facing wall 311 and the first end of power storage stack 20 to communicate with refrigerant supply path 6, is provided in second facing wall 312. Opening 313 forms the inlet of second path 62.

A pair of tubular portions are formed at each of the opposite ends of main body 310 in the height direction (direction DR3), and the tubular portion forms part of insertion portion 41 into which restraining member 40 is inserted. Refrigerant duct 4 is inserted into the clearance between the pair of tubular portions provided on the first side (lower side in FIG. 3) in the height direction (direction DR3).

Projection 314 projects toward the outside of power storage stack 20 in the direction of arrangement. Projection 314 is provided to project opposite to the direction of insertion of refrigerant duct 4.

Spacer 22 also includes a plurality of ribs similar to those described above on its front and rear surfaces of a plate-shaped portion disposed in the clearance between adjacent power storage cells 21. Consequently, first path 61 through which refrigerant can flow is formed in the clearance between adjacent power storage cells 21.

Figure 6:
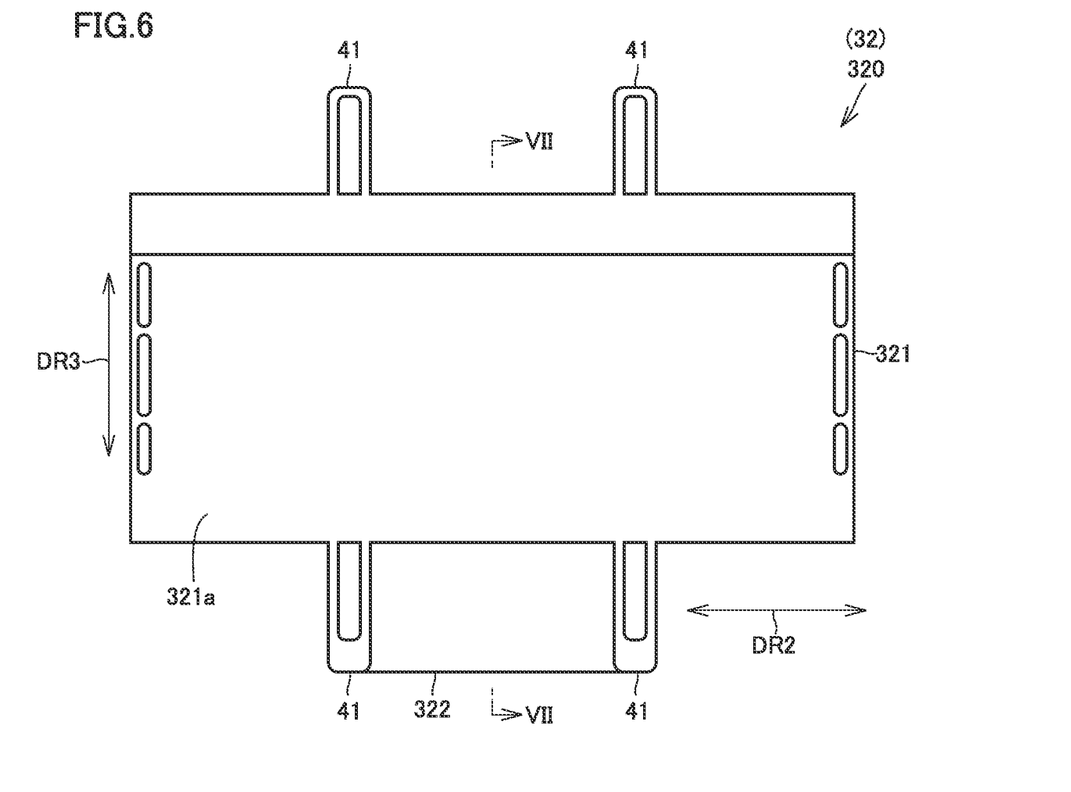
FIG. 6 is a plan view of a main body of a second end plate according to the embodiment, which is viewed from the front side.
Figure 7:
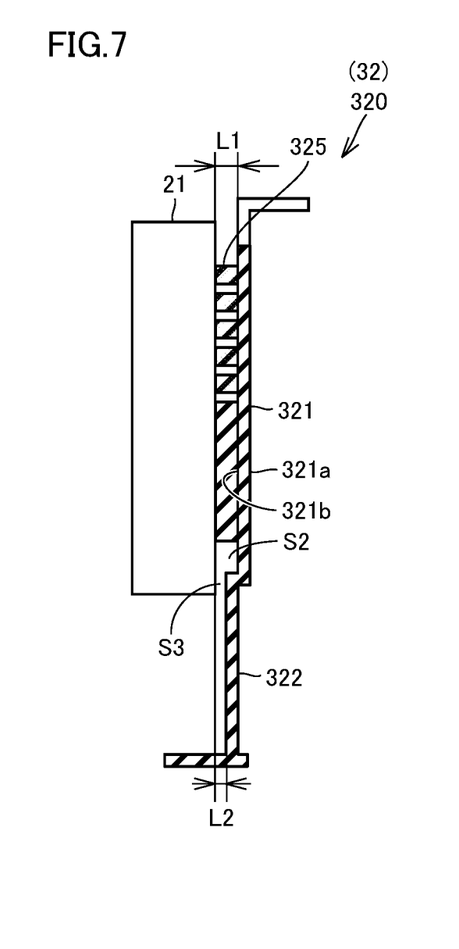
FIG. 7 is a sectional view of the second end plate, which is taken along the line VII-VII shown in FIG. 6.

FIG. 6 is a plan view of the main body of the second end plate according to the embodiment, which is viewed from the front side. FIG. 7 is a sectional view of the second end plate, which is taken along the line VII-VII shown in FIG. 6. For the sake of convenience, FIG. 7 shows power storage cell 21 located at the second end of power storage stack 20. Second end plate 32 will be described with reference to FIGS. 6 and 7.

As shown in FIGS. 6 and 7, second end plate 32 has main body 320, which is the third facing wall. Main body 320 faces the second end of power storage stack 20 in the direction of arrangement. Specifically, main body 320 faces the lateral surface on the second side in the direction of arrangement of power storage cell 21 located at the second end of power storage stack 20. Main body 320 is disposed at a distance from the lateral surface on the second side of power storage cell 21.

Main body 320 includes a first wall 321 and a second wall 322. First wall 321 mainly faces the lateral surface on the second side in the direction of arrangement of power storage cell 21 located at the second end of power storage stack 20. First wall 321 is disposed at a distance from the lateral surface on the second side of power storage cell 21.

Second wall 322 is connected to first wall 321 on the first side in the height direction. Second wall 322 is connected to the first wall on the refrigerant supply path 6 side. Second wall 322 is provided to extend toward the outside of power storage stack 20 in the height direction. Second wall 322 is provided to project into refrigerant supply path 6.

Second wall 322 is provided so as to be closer to the second end side of power storage stack 20 than first wall 321 is to the second end side of power storage stack 20 in the direction of arrangement. That is to say, a distance L2 between second wall 322 and the second end of power storage stack 20 in the direction of arrangement is smaller than a distance L1 between first wall 321 and the second end of power storage stack 20 in the direction of arrangement.

Through a clearance S3 between second wall 322 and the second end of power storage stack 20, a clearance S2 between first wall 321 and the second end of power storage stack 20 communicates with the refrigerant supply path.

The front surface 321a side of first wall 321 is provided substantially flatly to allow bracket portion 32a and fixing portion 32b described above to be assembled thereto. Ribs 325 are provided on a rear surface 321b of first wall 321. Ribs 325 are disposed in clearance S2 between first wall 321 and power storage cell 21. Ribs 325 form third path 63 through which refrigerant can flow in clearance S2 between first wall 321 and power storage cell 21.

Ribs 325 are provided substantially similarly to ribs 315 provided on first end plate 31. Ribs 325 cause the refrigerant introduced from the first side in the height direction (direction DR3) of power storage stack 20 to be discharged to the opposite sides in the width direction (direction DR2) of power storage stack 20.

Through clearance S3 between second wall 322 and the second end of power storage stack 20, clearance S2 between first wall 321 and the second end of power storage stack 20 communicates with refrigerant supply path 6. Clearance S3 between second wall 322 and the second end of power storage stack 20 serves as the inlet of third path 63.

A pair of tubular portions are formed at each of the opposite ends of main body 320 in the height direction (direction DR3), and the tubular portion forms part of insertion portion 41 into which restraining member 40 is inserted.

Figure 8:
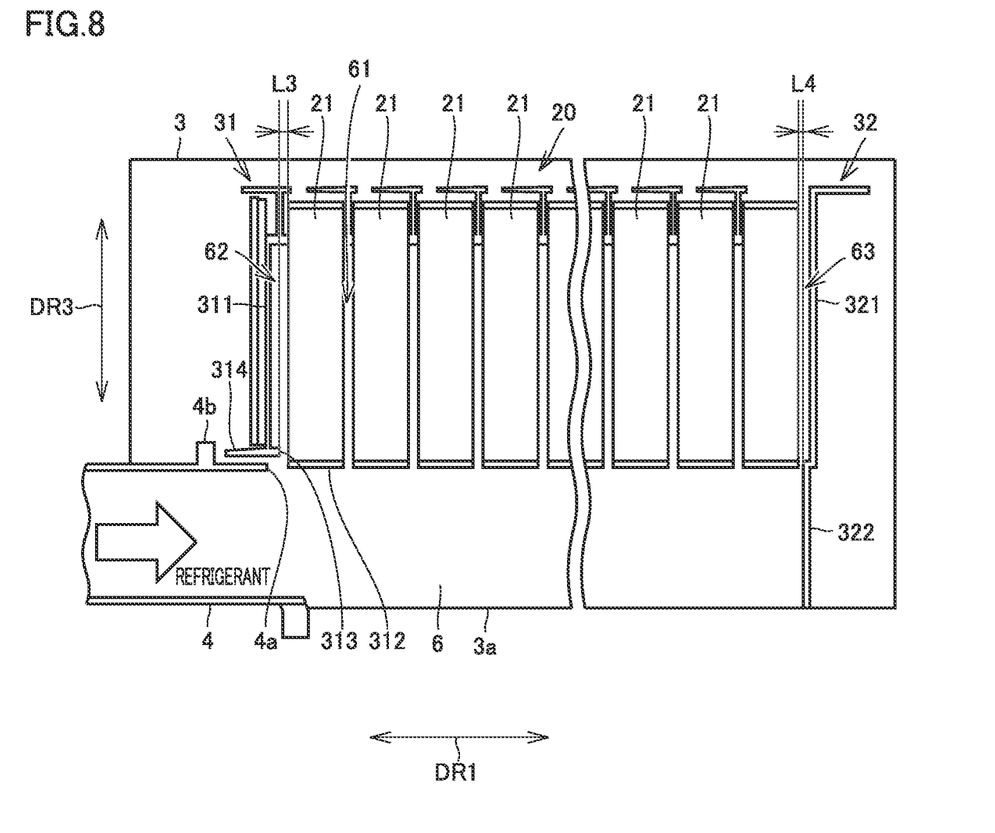
FIG. 8 shows a cross-section of the cooling structure for a power storage stack according to the embodiment.

FIG. 8 shows a cross-section of the cooling structure for a power storage stack according to the embodiment. As shown in FIG. 8, refrigerant supply path 6 is a region surrounded by a bottom 3a of housing case 3, the bottom of power storage stack 20, and a pair of insertion portions 41 extending in the direction of arrangement on the first side in the height direction of power storage stack 20.

A tip 4a side of refrigerant duct 4 is inserted into a first end side of refrigerant supply path 6. A stopper 4b is provided on the outer surface of refrigerant duct 4. Stopper 4b is provided so as to hit projection 314 provided in first end plate 31 such that tip 4a of refrigerant duct 4 does not block the inlet of second path 62 in the insertion of refrigerant duct 4 into the first end side of refrigerant supply path 6.

The refrigerant supplied to refrigerant supply path 6 through refrigerant duct 4 is introduced into first paths 61, second path 62, and third path 63 that communicate with refrigerant supply path 6. This can cool each of power storage cells 21 from the opposite sides in the direction of arrangement. Consequently, variations in temperature can be reduced from the first end side to the second end side of power storage stack 20 in the direction of arrangement.

Further, first paths 61, second path 62, and third path 63 are configured such that in cooling of power storage stack 20 by refrigerant, power storage stack 20 has a temperature distribution in which power storage cell 21 disposed on the second end side (the side on which second end plate 32 is located) of power storage stack 20 has a temperature higher than the temperature of power storage cell 21 located on the first end side (the side on which first end plate 31 is located) of power storage stack 20.

For example, the inlet of third path 63 has an area smaller than the area of the inlet of second path 62. Specifically, a distance L4 between second wall 322 and the second end of power storage stack 20 in the direction of arrangement is smaller than a width L3 of opening 313 in the direction of arrangement, which is provided on second facing wall 312 of first end plate 31, as described above. The area of the inlet of first path 61 may be substantially equal to the area of the inlet of second path 62.

As first paths 61, second path 62, and third path 63 are configured as described above, refrigerant less easily flows into the third path located downstream in the direction of supply of refrigerant than into the second path located upstream in the direction of supply of refrigerant. Consequently, power storage cell 21 disposed at the second end of power storage stack 20 easily has the highest temperature among the power storage cells.

Thus, the temperature of power storage cell 21 disposed at the second end of power storage stack 20 is managed not to exceed a predetermined reference temperature, so that the temperature of any other power storage cell 21 is also automatically prevented from exceeding the reference temperature. This leads to easy management of the temperature of power storage stack 20.

Figure 9:
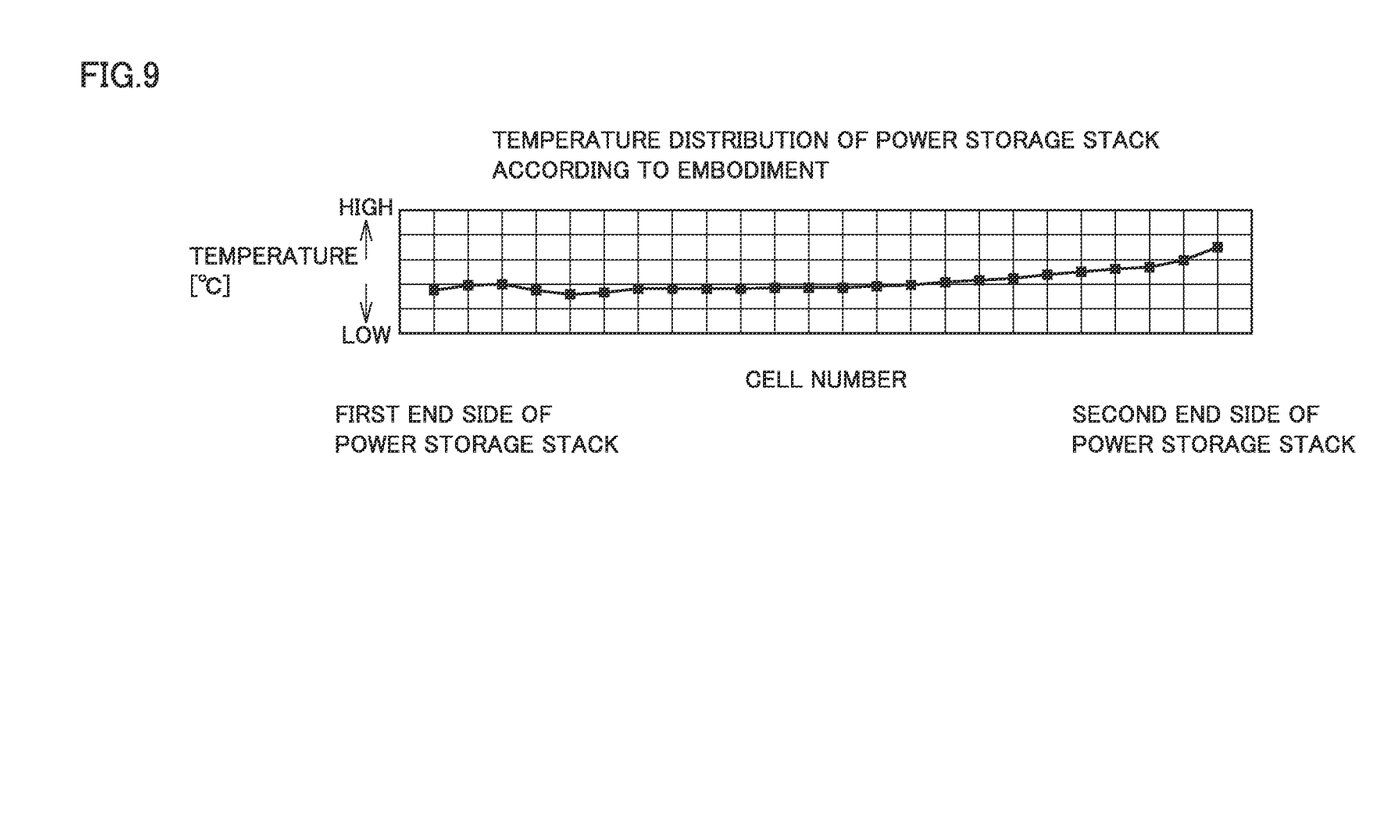
FIG. 9 shows a temperature distribution of the power storage stack according to the embodiment.

FIG. 9 shows a temperature distribution of the power storage stack according to the embodiment. The horizontal axis of FIG. 9 represents numbers of arranged power storage cells 21 (cell numbers). The vertical axis of FIG. 9 represents the temperatures of the power storage cells. The temperature distribution of power storage stack 20 cooled by the cooling structure for the power storage stack will be described with reference to FIG. 9.

As shown in FIG. 9, power storage stack 20 includes power storage cells 21 disposed side by side. As described above, power storage stack 20, cooled by the cooling structure for a power storage stack which includes first paths 61, second path 62, and third path 63, has a temperature distribution in which the temperature of a power storage cell disposed on the second end side of power storage stack 20 is higher than the temperature of a power storage cell disposed on the first end side of power storage stack 20.

Although the temperatures of the power storage cells disposed on the first end side of power storage stack 20 vary somewhat, the temperatures gradually increase from the first end side of power storage stack 20 toward the second end side of power storage stack 20. Power storage cell 21 located at the second end of power storage stack 20 has the highest temperature. A difference in temperature between the power storage cell having the highest temperature and the power storage cell having the lowest temperature is smaller than a difference in temperature in a comparative example, which will be described below.

Comparative Example

Figure 10:
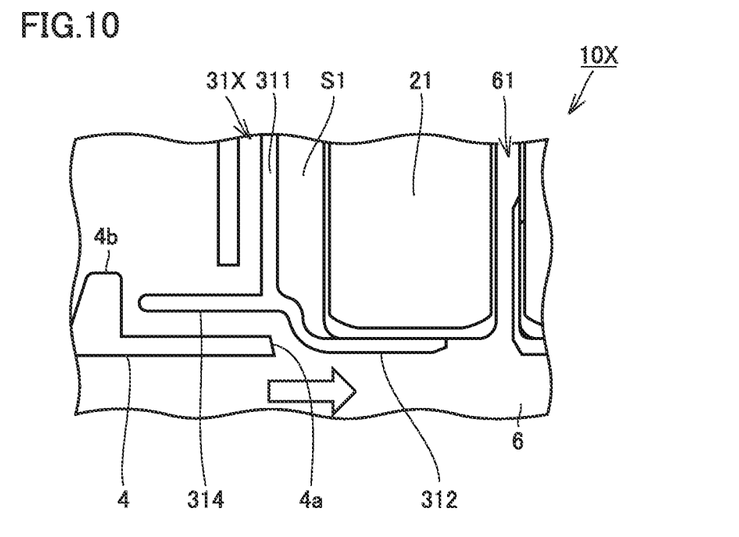
FIG. 10 shows a first end plate and its vicinity located on a refrigerant supply path side in a cooling structure for a power storage stack according to a comparative example.
Figure 11:
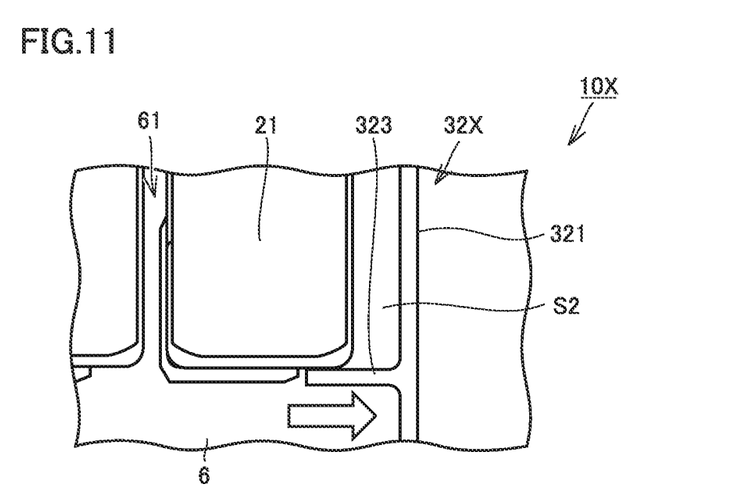
FIG. 11 shows a second end plate and its vicinity located on the refrigerant supply path side in the cooling structure for a power storage stack according to the comparative example.

FIG. 10 shows a first end plate and its vicinity located on the refrigerant supply path side in a cooling structure for a power storage stack according to a comparative example. FIG. 11 shows a second end plate and its vicinity located on the refrigerant supply path side in the cooling structure for a power storage stack according to the comparative example. A cooling structure 10X for a power storage stack in the comparative example will be described with reference to FIGS. 10 and 11.

Cooling structure 10X for a power storage stack in the comparative example differs from cooling structure 10 for a power storage stack according to the embodiment in the configurations of a first end plate 31X and a second end plate 32X. The configurations of the other components are substantially the same.

As shown in FIG. 10, first end plate 31X differs from first end plate 31 according to the embodiment in that no opening is provided in second facing wall 312. In cooling structure 10X for a power storage stack which includes first end plate 31X, clearance S1 between first facing wall 311 and the first end of power storage stack 20 does not communicate with refrigerant supply path 6.

As shown in FIG. 11, second end plate 32X differs from second end plate 32 according to the embodiment in that a plate 323 is provided to block clearance S2 between first wall 321 and the second end of power storage stack 20. In cooling structure 10X for a power storage stack which includes second end plate 32X, clearance S2 between first wall 321 and the second end of power storage stack 20 does not communicate with refrigerant supply path 6.

Figure 12:
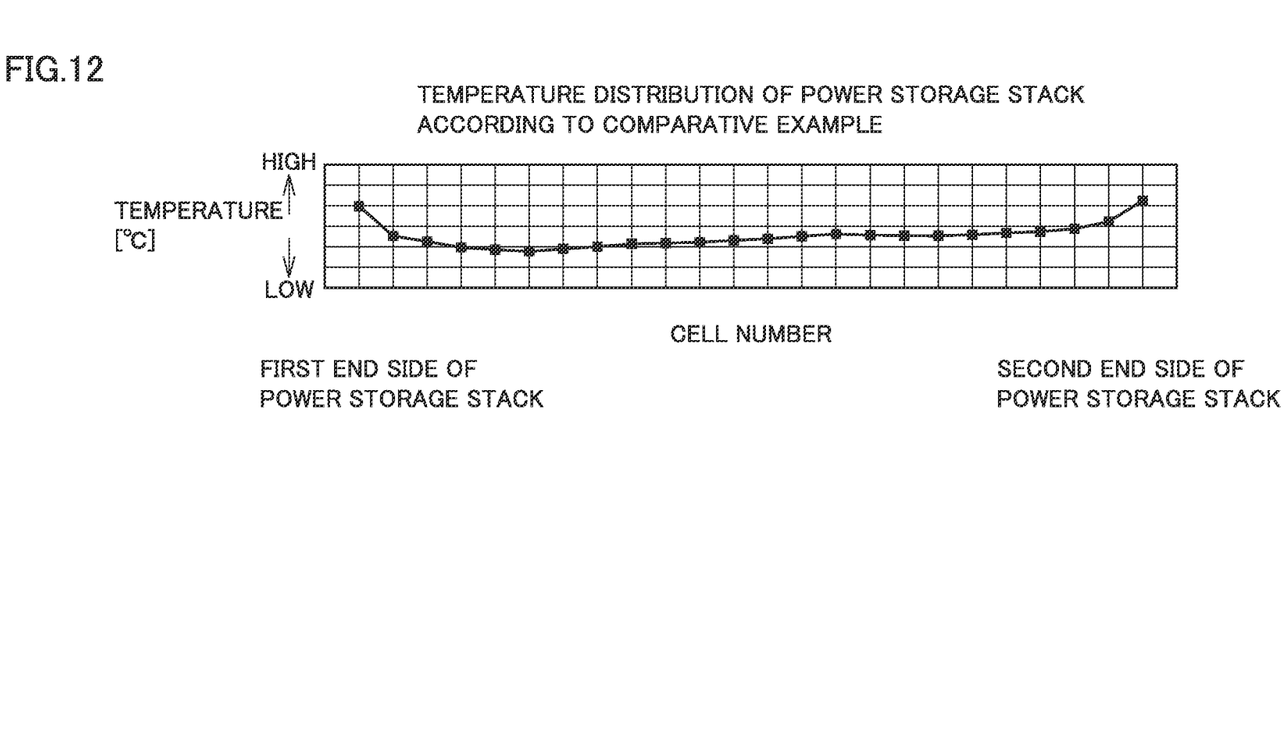
FIG. 12 shows a temperature distribution of the power storage stack according to the comparative example.

FIG. 12 shows a temperature distribution of the power storage stack according to the comparative example. The temperature distribution of the power storage stack according to the comparative example will be described with reference to FIG. 12. The scales of the vertical axis and the horizontal axis of FIG. 12 are substantially identical to those of FIG. 9.

As shown in FIG. 12, power storage stack 20 includes a plurality of power storage cells arranged side by side also in the comparative example. As described above, when clearance S1 between first facing wall 311 and the first end of power storage stack 20 does not communicate with refrigerant supply path 6 and clearance S2 between first wall 321 and the second end of power storage stack 20 does not communicate with refrigerant supply path 6, only one of a pair of lateral portions opposed to each other in the direction of arrangement is cooled in cells located at the opposite ends in the direction of arrangement. Both of the pair of lateral portions are cooled in the other cells.

Thus, power storage stack 20 has a temperature distribution in which the power storage cells disposed at the opposite ends in the direction of arrangement have higher temperature. Also, a temperature difference occurs between the power storage cell having the highest temperature and the power storage cell having the lowest temperature, and variations in temperature are wider than those in the embodiment.

Further, since the temperature of each of the power storage cells disposed at the opposite ends in the direction of arrangement becomes higher, even when the temperature of one of the power storage cells is controlled, the management of the temperature of the other power storage cell is difficult. This requires the use of a plurality of thermometers to manage the temperatures of both the power storage cells, leading to difficult temperature management of power storage stack 20.

As described above, the comparison between the embodiment and the comparative example reveals that cooling structure 10 for a power storage stack according to the embodiment can easily manage the temperature of the power storage stack with reduced variations in the temperature of power storage stack 20, as described above.

Although the embodiment has described by way of example the case in which the areas of the inlets of first paths 61, second path 62, and third path 63 are appropriately adjusted such that refrigerant less easily flows into third path 63 than into second path 62, the present disclosure is not limited thereto. Alternatively, the height of the rib of second end plate 32 may be made smaller than the height of the rib of first end plate 31, or the width of the rib of second end plate 32 may be increased, thus causing the volume of third path 63 to be smaller than the volume of second path 62.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A cooling structure for a power storage stack, the cooling structure comprising:
a power storage stack including a plurality of power storage cells arranged in a predetermined direction of arrangement;
a first end plate and a second end plate each disposed on a corresponding one of opposite outer sides of the power storage stack in the direction of arrangement;
a refrigerant supply path provided in the direction of arrangement for supplying refrigerant from a first end side toward a second end side of the power storage stack in the direction of arrangement; and
a plurality of first paths each provided in a clearance between two of the power storage cells adjacent to each other, the plurality of first paths communicating with the refrigerant supply path, wherein the first end plate is configured to form a second path communicating with the refrigerant supply path in a clearance between a first end of the power storage stack and the first end plate,
the second end plate is configured to form a third path communicating with the refrigerant supply path in a clearance between a second end of the power storage stack and the second end plate, wherein an inlet of the third path has an area smaller than an area of an inlet of the second path, and
the plurality of first paths, the second path, and the third path are configured such that in cooling of the power storage stack by the refrigerant, the power storage stack has a temperature distribution in which the power storage cells disposed on the second end side have temperatures higher than temperatures of power storage cells disposed on the first end side,
wherein
the first end plate includes
a first facing wall facing the first end of the power storage stack, and
a second facing wall connected to the first facing wall and facing one of the power storage cells which is located at the first end of the power storage stack from a refrigerant supply path side,
the second facing wall is provided with an opening for causing a clearance between the first facing wall and the first end of the power storage stack to communicate with the refrigerant supply path,
the second end plate includes a third facing wall facing the second end of the power storage stack,
the third facing wall has
a first wall, and
a second wall connected to the first wall on the refrigerant supply path side and provided to be closer to the second end side of the power storage stack than the first wall is to the second end side of the power storage stack in the direction of arrangement,
a clearance between the first wall and the second end of the power storage stack communicates with the refrigerant supply path through a clearance between the second wall and the second end of the power storage stack, and
a distance between the second wall and the second end of the power storage stack in the direction of arrangement is smaller than a width of the opening in the direction of arrangement.

2. The cooling structure for a power storage stack according to claim 1, further comprising a refrigerant duct to be inserted into a first end side of the refrigerant supply path at which the first end plate is located, wherein
the first end plate has a projection projecting opposite to a direction of insertion of the refrigerant duct, and
the refrigerant duct has a stopper capable of hitting the projection such that a tip side of the refrigerant duct does not block an inlet of the second path.

3. A cooling system for a power storage stack, the cooling system comprising:
a cooling structure for a power storage stack according to claim 1;
a refrigerant supply source that supplies the refrigerant to the refrigerant supply path;
a controller that controls an operation of the refrigerant supply source; and
a thermometer that measures a temperature of one of the power storage cells which is located at the second end of the power storage stack, wherein the controller controls the operation of the refrigerant supply source such that an amount of supply of the refrigerant increases when the temperature measured by the thermometer attains to a predetermined temperature or higher.

\* \* \* \* \*